(12) United States Patent
Ishibiki

(10) Patent No.: US 12,711,651 B2
(45) Date of Patent: Aug. 18, 2026

(54) IMAGING APPARATUS, METHOD FOR CONTROLLING THE SAME, AND STORAGE MEDIUM

(71) Applicant: CANON KABUSHIKI KAISHA, Tokyo (JP)

(72) Inventor: Jumpei Ishibiki, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 18/512,752

(22) Filed: Nov. 17, 2023

(65) Prior Publication Data

US 2024/0177336 A1 May 30, 2024

(30) Foreign Application Priority Data

Nov. 29, 2022 (JP) ................................ 2022-190752

(51) Int. Cl.
*G06V 40/10* (2022.01)
*G06T 7/60* (2017.01)
*G06T 7/70* (2017.01)
*G06V 10/60* (2022.01)

(52) U.S. Cl.
CPC .................. *G06T 7/70* (2017.01); *G06T 7/60* (2013.01); *G06V 10/60* (2022.01); *G06V 40/10* (2022.01); *G06T 2207/10152* (2013.01); *G06T 2207/30196* (2013.01)

(58) Field of Classification Search
CPC ... G06T 7/70; G06T 7/60; G06T 2207/10152; G06T 2207/30196; G06V 40/10
See application file for complete search history.

(56) References Cited

U.S. PATENT DOCUMENTS

2018/0108179 A1* 4/2018 Tomlin .................. G06F 3/0346
2019/0132508 A1* 5/2019 Hamano ............ G02B 27/0037
2020/0033937 A1* 1/2020 Erivantcev .............. G06T 7/246
2022/0012505 A1* 1/2022 Kato ...................... G06V 20/58
2023/0379588 A1* 11/2023 Li .......................... H04N 23/71
2024/0144631 A1* 5/2024 Sakata ................. G06V 10/761

FOREIGN PATENT DOCUMENTS

JP 2002314851 A 10/2002
JP 2006270274 A 10/2006
JP 2022148061 A * 10/2022 ........... B60W 30/06
JP 7334632 B2 * 8/2023

* cited by examiner

*Primary Examiner* — Shaghayegh Azima
(74) *Attorney, Agent, or Firm* — Canon U.S.A., Inc. IP Division

(57) ABSTRACT

An imaging apparatus includes an acquisition unit configured to acquire an image, a first detection unit configured to detect a subject in the image, an information acquisition unit configured to acquire information from a measurement unit attached to the subject, a second detection unit configured to detect a position of the subject based on the information acquired by the information acquisition unit, and a determination unit configured to prioritize either the first detection unit or the second detection unit to determine the position of the subject. In a case where the determination unit determines that reliability of a detection result by the first detection unit is lower than a predetermined value, the determination unit prioritizes a detection result by the second detection unit to determine the position of the subject.

15 Claims, 10 Drawing Sheets

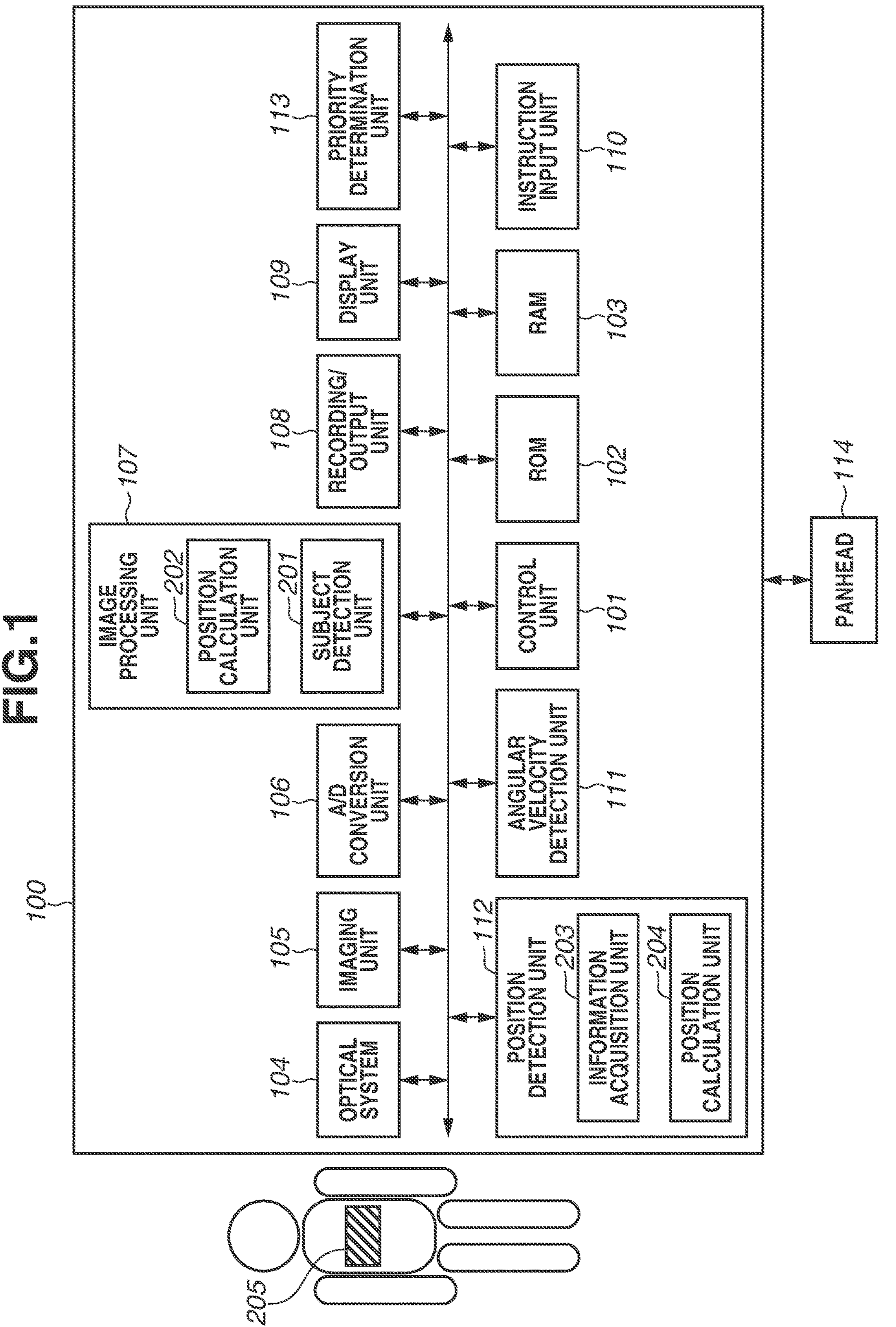
FIG.1
100
104
OPTICAL SYSTEM
105
IMAGING UNIT
106
A/D CONVERSION UNIT
107
IMAGE PROCESSING UNIT
202
POSITION CALCULATION UNIT
201
SUBJECT DETECTION UNIT
108
RECORDING/ OUTPUT UNIT
109
DISPLAY UNIT
113
PRIORITY DETERMINATION UNIT
112
POSITION DETECTION UNIT
203
INFORMATION ACQUISITION UNIT
204
POSITION CALCULATION UNIT
ANGULAR VELOCITY DETECTION UNIT
111
CONTROL UNIT
101
ROM
102
RAM
103
INSTRUCTION INPUT UNIT
110
114
PANHEAD
205

FIG.8

IMAGING APPARATUS, METHOD FOR CONTROLLING THE SAME, AND STORAGE MEDIUM

BACKGROUND

Field of the Disclosure

The present disclosure relates to an imaging apparatus such as a camera, and especially relates to a technique for capturing an image of a moving subject.

Description of the Related Art

In recent years, as a technique for an imaging apparatus, such as a camera or a smartphone, using a panhead or a gimbal that is configured to mount the camera or the smartphone, a technique of detecting a subject based on information of a captured image, and assisting imaging by tracking the subject or adjusting the focus of the subject has been known. With the method of detecting the subject based on the information of the image, however, it is difficult to detect the subject in a situation, for example, where the subject is hidden behind another object.

To address this, a technique of attaching a position information transmission apparatus to the subject to enable the camera to recognize the position of the subject is discussed.

For example, Japanese Patent Application Laid-Open No. 2002-314851 discusses a technique of calculating the position of a subject based on position information transmitted from an apparatus attached to the subject and the orientation of an imaging apparatus, and displaying information regarding the position and direction of the subject on a display screen.

Japanese Patent Application Laid-Open No. 2006-270274 discusses a technique of determining a subject detection range on a screen based on position information transmitted from an apparatus attached to a subject and detecting the subject within the determined range.

With the conventional technique discussed in Japanese Patent Application Laid-Open No. 2002-314851, there is a case where the subject cannot be detected accurately depending on the size of the subject in the image or where in the subject the position information transmission apparatus is attached. With the conventional technique discussed in Japanese Patent Application Laid-Open No. 2006-270274, it may be difficult to detect the subject in a case, for example, where the subject is hidden behind an object other than the subject.

SUMMARY

Aspects of the present disclosure have been made in consideration of the above situation and is directed to providing an imaging apparatus capable of keeping capturing a subject even under a condition that makes it difficult to recognize the subject on a screen, a method for controlling the imaging apparatus, and a storage medium.

According to an aspect of the present disclosure, an imaging apparatus includes an acquisition unit configured to acquire an image, a first detection unit configured to detect a subject in the image, an information acquisition unit configured to acquire information from a measurement unit attached to the subject, a second detection unit configured to detect a position of the subject based on the information acquired by the information acquisition unit, and a determination unit configured to prioritize either the first detection unit or the second detection unit to determine the position of the subject. In a case where the determination unit determines that reliability of a detection result by the first detection unit is lower than a predetermined value, the determination unit prioritizes a detection result by the second detection unit to determine the position of the subject.

Further features of the present disclosure will become apparent from the following description of embodiments with reference to the attached drawings.

BRIEF DESCRIPTION OF THE DRAWINGS

FIG. 1 is a block diagram illustrating a configuration of an imaging system.

FIG. 8 is a flowchart illustrating processing from when the imaging apparatus starts detection to when the imaging apparatus detects the subject according to a second embodiment.

DESCRIPTION OF THE EMBODIMENTS

Figure 2:
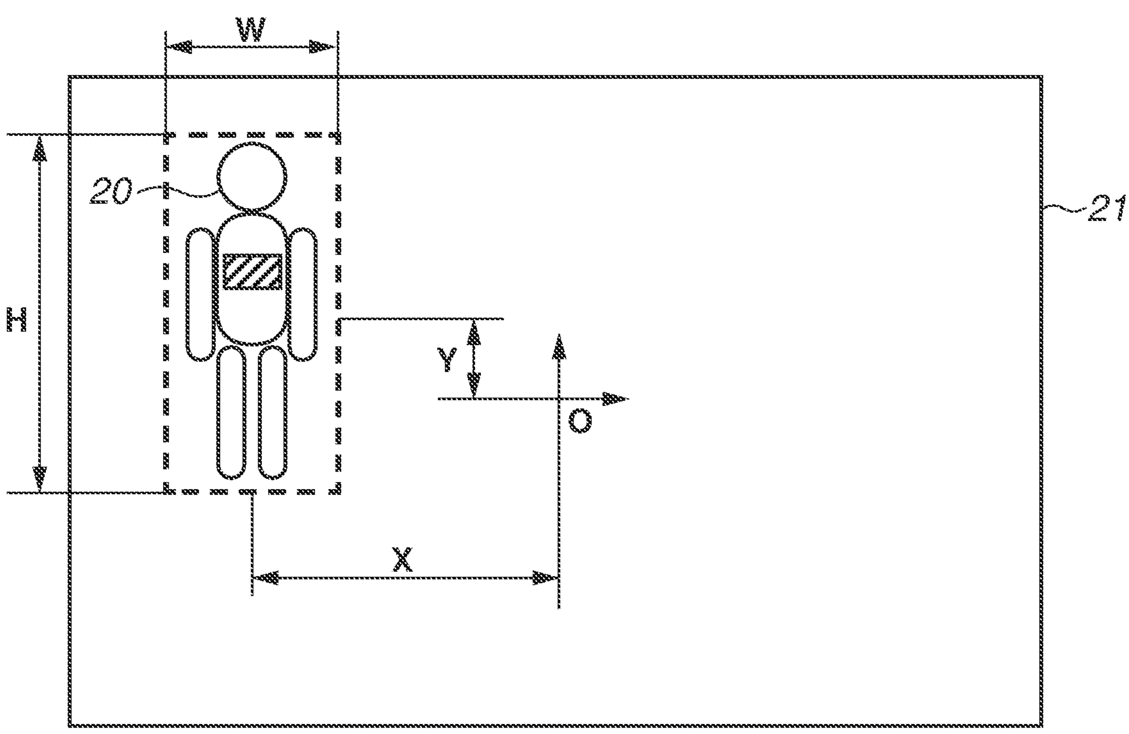
FIG. 2 is a diagram illustrating an example in which a subject is present within a screen.

Embodiments of the present disclosure will be described in detail below with reference to the accompanying drawings. The following embodiments do not intend to limit the claimed disclosure. While a plurality of features is described in the embodiments, all combinations of the features are not essential to the present disclosure, and the features may be combined as appropriate. In the accompanying drawings, the same or similar components are denoted by the same reference numerals, and a redundant description thereof will be omitted.

FIG. 1 is a block diagram illustrating a configuration of an imaging system according to a first embodiment of the present disclosure. The imaging system includes a digital camera 100 including an imaging unit 105. The digital camera 100 is an example of an imaging apparatus according to the present embodiment. The imaging system according to the present embodiment can be applied not only to the digital camera 100, but also to any electronic apparatus capable of processing captured images and subject position information. Examples of the electronic apparatus may include a mobile phone, a game machine, a tablet terminal, a personal computer, a watch-type information terminal, a spectacle-type information terminal, and a head-mounted display.

A control unit 101 is, for example, a central processing unit (CPU) and is configured to read out a control program for each block of the digital camera 100 from a read-only memory (ROM) 102 (described below), load the control program into a random-access memory (RAM) 103 (described below), and execute the control program.

With this configuration, the control unit 101 controls the operation of each block of the digital camera 100.

The ROM 102 is a non-volatile memory that is electrically erasable and recordable, and stores operation programs for the blocks of the digital camera 100 and parameters and the like to be used to operate the blocks.

The RAM 103 is a rewritable volatile memory and is used to load a program to be executed by the control unit 101 and temporarily store data generated by the operations of the blocks of the digital camera 100.

An optical system 104 includes a lens group including a zoom lens and a focus lens and forms a subject image on an imaging plane of the imaging unit 105 (described below). The optical system 104 may be an interchangeable system for the digital camera 100. In this case, the digital camera 100 and the optical system 104 communicate with each other via mount contacts (not illustrated). The digital camera 100 may perform communication control via the mount contacts to adjust a diaphragm aperture system (not illustrated) in the optical system 104 to adjust the quantity of light to be received, and adjust the position of the lens group to enable focus position adjustment.

The imaging unit 105 is, for example, an image sensor, such as a charge-coupled device (CCD) sensor or a complementary metal-oxide semiconductor (CMOS) sensor, which photoelectrically converts an optical image that is formed by the optical system 104 on the imaging plane of the imaging unit 105, and outputs the resulting analog image signal to an analog-to-digital (A/D) conversion unit 106.

The A/D conversion unit 106 converts the input analog image signal into digital image data. The digital image data output from the A/D conversion unit 106 is temporarily stored into the RAM 103.

An image processing unit 107 performs various kinds of image processing on image data stored in the RAM 103. More specifically, the image processing includes preliminary processing, such as signal amplification and reference level adjustment, color interpolation processing for interpolating color component values not included in image data, and correction processing, such as white balance adjustment and image luminance correction. The image processing also includes processing on brightness (luminance) information and contrast information of image data.

The image processing unit 107 includes a subject detection unit 201 that detects a subject, and a position calculation unit 202 that calculates a position of the detected subject in image data. Detection processing by the subject detection unit 201 includes detection and tracking processing for detecting and tracking a feature region (e.g., a face region or a human body region) and recognition processing for recognizing a person, an animal, or the like. A known method is used in the detection processing by the subject detection unit 201, and a detailed description thereof will thus be omitted.

The position calculation unit 202 will now be described with reference to FIG. 2. FIG. 2 illustrates an example in which a subject 20 is present within a screen 21. The position calculation unit 202 calculates the position and size of the subject 20 on the screen 21 based on image data subjected to the detection processing by the subject detection unit 201 of the image processing unit 107. For example, as illustrated in FIG. 2, the position calculation unit 202 calculates a center position (X, Y) of the subject 20 with respect to a center O of the screen 21, a height H of the subject 20, and a width W of the subject 20.

A recording/output unit 108 records data including image data into a recording medium such as a detachable memory card, and outputs the data to an external apparatus via an external interface. The recording/output unit 108 records the image data processed by the image processing unit 107 as a recorded image via the RAM 103.

A display unit 109 includes a display device such as a liquid crystal display (LCD) and displays, on the display device, an image stored in the RAM 103 or an image recorded in the recording/output unit 108. The display unit 109 also displays an operation user interface for receiving instructions from a user. The display unit 109 may include a plurality of display devices such as an electronic viewfinder (EVF) and a back surface monitor arranged on a user side (a back surface side). The display unit 109 may enable simultaneous output to the plurality of display devices or may switch among the display devices to selectively perform display.

An instruction input unit 110 is an input interface including various physical operation members, such as a touch panel and a shutter button, and is configured to receive instructions input by the user.

An angular velocity detection unit 111 is, for example, an angular velocity sensor (a gyro sensor) and is configured to detect an angular velocity of a main body of the digital camera 100 that rotates in a yaw direction and a pitch direction due to hand shake or camerawork. The angular velocity detection unit 111 is assumed to use a known method as an angular velocity detection method, and a detailed description thereof will thus be omitted.

A position detection unit 112 includes an information acquisition unit 203 and a position calculation unit 204. The information acquisition unit 203 acquires information transmitted from a measurement apparatus 205 (a measurement unit) attached to the subject 20. The position detection unit 112 is configured to calculate the position of the subject 20 with respect to the digital camera 100, using the position calculation unit 204 based on the information acquired by the information acquisition unit 203.

The measurement apparatus 205 measures the position of the subject 20 using a known method. For example, the position on the earth can be measured using a global positioning system (GPS). The relative position between the measurement apparatus 205 and the digital camera 100 can also be measured using one or a plurality of transmitters and one or a plurality of receivers that are arranged in the measurement apparatus 205 and the digital camera 100, respectively. While the measurement apparatus 205 is not limited to the above examples, the example of using the GPS will be described here for convenience sake.

Figure 3:
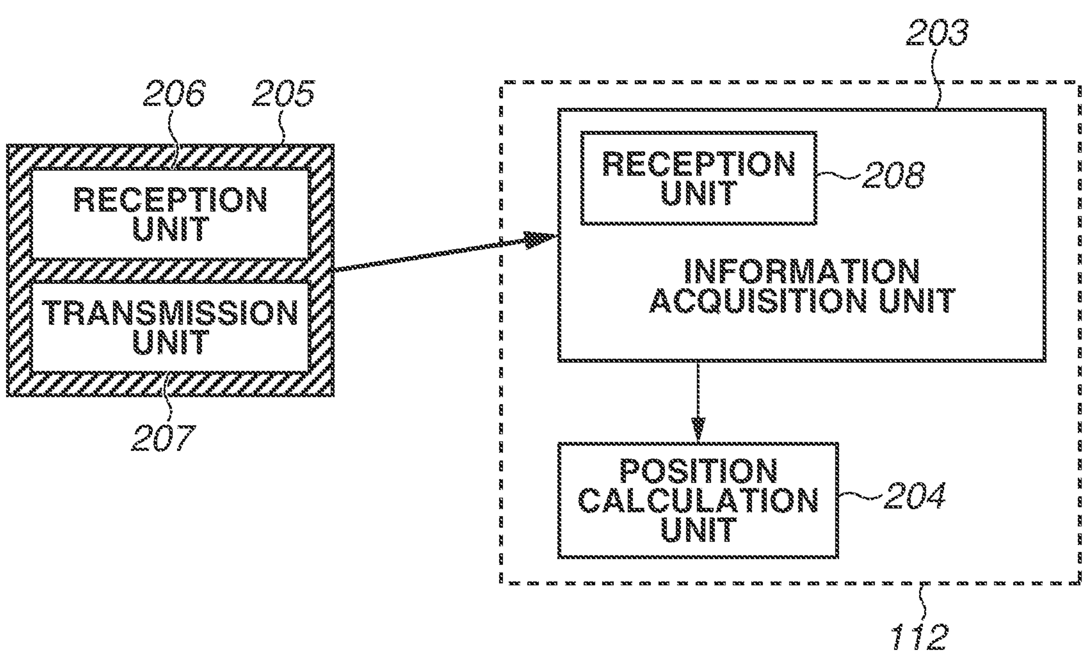
FIG. 3 is a block diagram illustrating a configuration of a measurement unit and a second detection unit of an imaging apparatus.

The measurement apparatus 205 includes a reception unit 206 and a transmission unit 207 as illustrated in FIG. 3. The reception unit 206 receives signals from a plurality of satellites (not illustrated) and detects the position of the measurement apparatus 205 based on the received signals. Position information indicating the detected position is recognized as three-dimensional data based on a coordinate system fixed to a macroscopic fixed object such as the earth. For example, with the center of the earth as the origin, any position can be determined by three axes, a rotation axis of the earth, an axis passing through the origin and a predetermined point on the equator, and an axis passing through the origin and orthogonal to the axis passing through the predetermined point. The transmission unit 207 transmits the determined position, and the information acquisition unit 203 of the digital camera 100 acquires the information about the determined position. Similarly, the information acquisition unit 203 of the digital camera 100 includes a reception unit 208 that is configured to receive signals from the plurality of satellites and detect the position of the digital camera 100 based on the received signals. The position calculation unit 204 is configured to calculate the position of the measurement apparatus 205 with respect to the digital camera 100, based on the position information about the measurement apparatus 205 and the position information about the digital camera 100 that are acquired by the information acquisition unit 203.

The digital camera 100 performs preparatory imaging (live view imaging) to sequentially display images, which are sequentially output from the imaging unit 105 and sequentially subjected to image processing, on the display device under control of the control unit 101.

During the preparatory imaging, it is possible to make preparations for main imaging, which include adjustment of a composition and change of imaging parameters for the main imaging, such as an exposure time (a Tv value), an aperture value (an Av value), and International Standards Organization (ISO) sensitivity, assuming that recording into a recording medium, output to an external apparatus, and the like are performed in the main imaging.

The digital camera 100 further includes a priority determination unit 113. The priority determination unit 113 determines which of the subject detection unit 201 and the position detection unit 112 is prioritized to detect the position of the subject 20 depending on a condition (described below).

In the present embodiment, a panhead 114 and the optical system 104 are driven and controlled in pan, tilt, and zoom directions based on the information about the detected position of the subject 20 that is acquired by the subject detection unit 201 or the position detection unit 112, whereby the subject 20 can be automatically tracked. With this configuration, it is possible to capture an image of the subject 20 within an angle of view without the user's operation.

Figure 4:
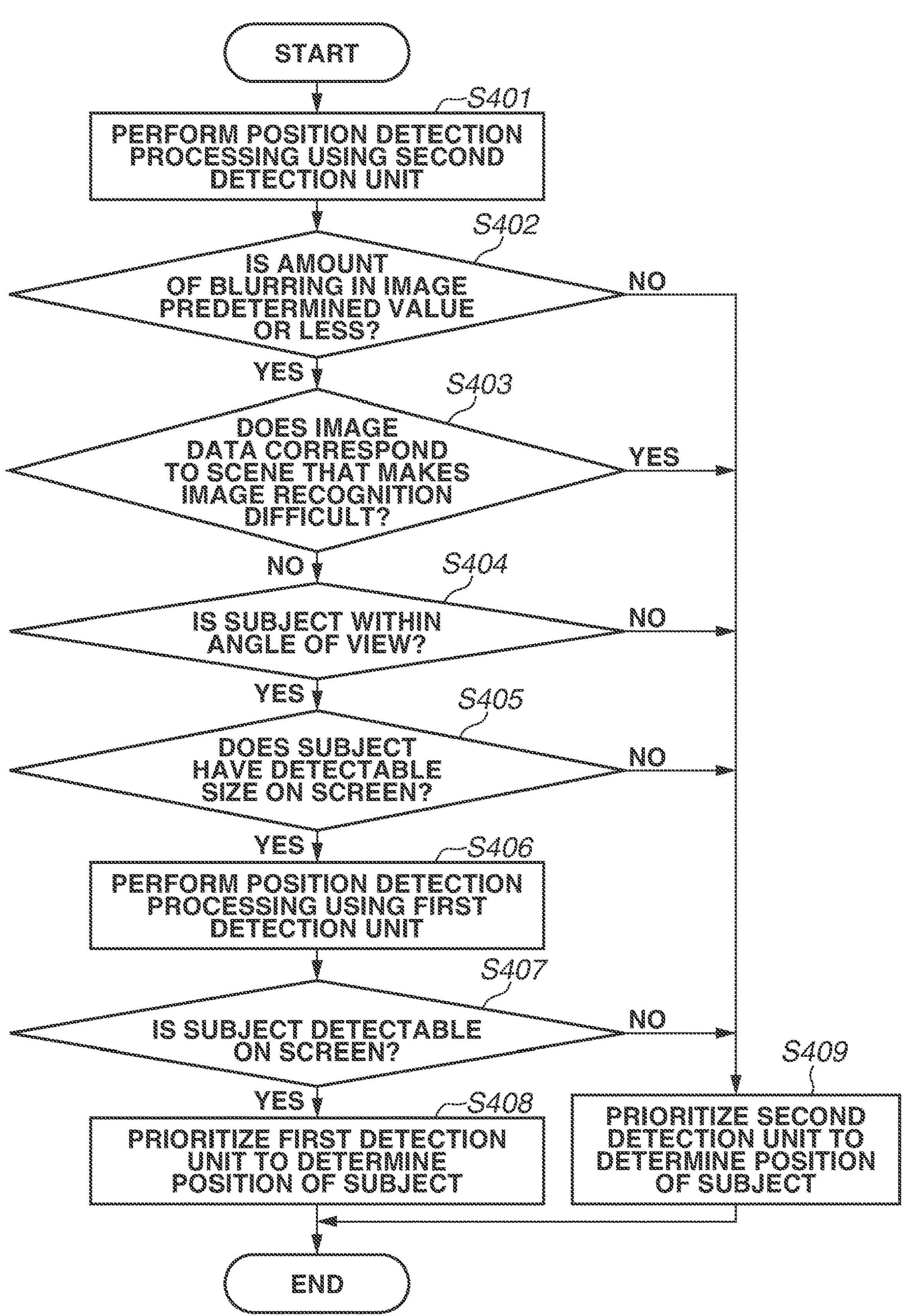
FIG. 4 is a flowchart illustrating processing from when the imaging apparatus starts detection to when the imaging apparatus detects the subject according to a first embodiment.

A subject detection method according to the present embodiment will be described below with reference to FIG. 4 to FIG. 7B. In the present embodiment, the position of the subject 20 is determined using either a subject detection result by the image processing unit 107 or a subject detection result by the position detection unit 112, whichever is more reliable. FIG. 4 is a flowchart illustrating processing from when the digital camera 100 starts detection to when the digital camera 100 detects the subject 20. Steps in the flowchart are performed by the control unit 101 or by the components of the digital camera 100 based on instructions from the control unit 101.

In step S401, when the subject detection unit 201 of the digital camera 100 starts subject detection processing, the position detection unit 112 (a second detection unit) performs position detection processing to detect the position of the subject 20. Contents of the position detection processing by the position detection unit 112 are as described above. Upon completion of the position detection processing, the processing proceeds to step S402.

In step S402, the angular velocity detection unit 111 detects the shake of the digital camera 100 (performs shake detection). The image processing unit 107 calculates the amount of blurring in an image captured by the digital camera 100, based on information about the shake detected by the angular velocity detection unit 111. If the calculated amount of blurring exceeds a predetermined value (NO in step S402), the priority determination unit 113 determines that the detection of the subject 20 by the subject detection unit 201 is difficult, and the processing proceeds to step S409. The angular velocity detection unit 111 is used together with the image processing unit 107 in order to calculate the amount of blurring in the image captured by the digital camera 100, but another device such as an acceleration sensor may be used as long as a similar effect can be obtained. If the amount of blurring in the image captured by the digital camera 100 is the predetermined value or less (YES in step S402), the processing proceeds to step S403.

In step S403, based on information such as brightness of image data processed by the image processing unit 107, the priority determination unit 113 determines whether or not the shooting scene corresponds to a scene that makes image recognition difficult.

More specifically, the priority determination unit 113 determines whether the image data corresponds to the scene that makes image recognition difficult, based on a predetermined threshold that is set depending on the information. The image processing unit 107 can obtain the information, such as brightness or contrast, in a desired range from the image data. For example, the image processing unit 107 calculates the brightness of the entire image data including the subject 20, and the priority determination unit 113 acquires the information about the brightness calculated by the image processing unit 107. If the priority determination unit 113 determines that the value of the brightness acquired by the priority determination unit 113 is less than the predetermined threshold, the image data is determined to correspond to the scene that makes image recognition difficult. Thus, the priority determination unit 113 determines that the detection of the subject 20 by the subject detection unit 201 is difficult (YES in step S403), and the processing proceeds to step S409.

For example, in the case of imaging with backlight, when an image includes a region on which a large amount of sunlight is incident and a region in which the subject 20 is in shadow, the region of the subject 20 may be dark and the detection of the subject 20 may be difficult. To address this, in a case where the value of the brightness of the subject 20 in the image, which is calculated by the image processing unit 107, is determined to be less than the predetermined threshold, the priority determination unit 113 determines that the image data corresponds to the scene that makes image recognition difficult, and determines that the detection of the subject 20 by the subject detection unit 201 (a first detection unit) is difficult (YES in step S403), and the processing proceeds to step S409. Another configuration may be adopted in which the image processing unit 107 calculates the brightness and determines whether the value of the calculated brightness is less than the predetermined threshold, and the priority determination unit 113 acquires a result of the determination.

In this case, the priority determination unit 113 determines whether the image data corresponds to the scene that makes image recognition difficult, based on the acquired determination result.

The image processing unit 107 can calculate contrast between the subject 20 and the background in the image or contrast within the subject 20. At this time, if the image processing unit 107 determines that the calculated contrast is less than a predetermined threshold, the priority determination unit 113 determines that the image data corresponds to the scene that makes image recognition difficult and the detection of the subject 20 by the subject detection unit 201 is difficult (YES in step S403), and the processing proceeds to step S409.

As described above, the image processing unit 107 makes a determination about the brightness of a partial region of the image, the difference in brightness, the contrast between the subject 20 and the background, or the contrast within the subject 20, and detects the scene that makes image recognition difficult. If the priority determination unit 113 determines that the image data does not correspond to the scene that makes image recognition difficult (NO in step S403), the processing proceeds to step S404. While the scene that makes image recognition difficult has been described as an example, the present embodiment is not limited thereto.

Figure 5A:
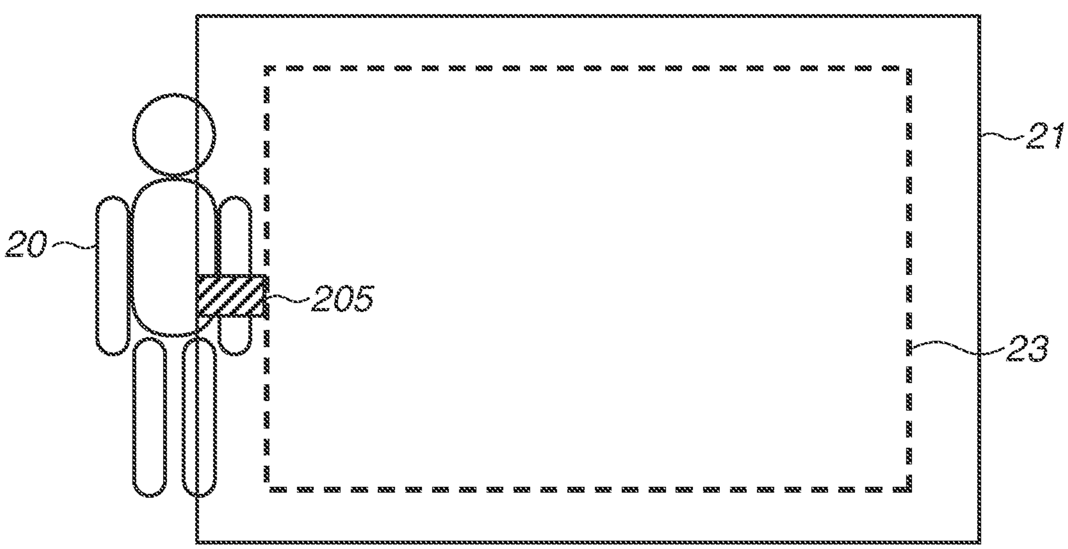
FIGS. 5A and 5B are diagrams each illustrating an example of a screen displayed in determining whether the subject is within an imaging angle of view according to the first embodiment.
Figure 5B:
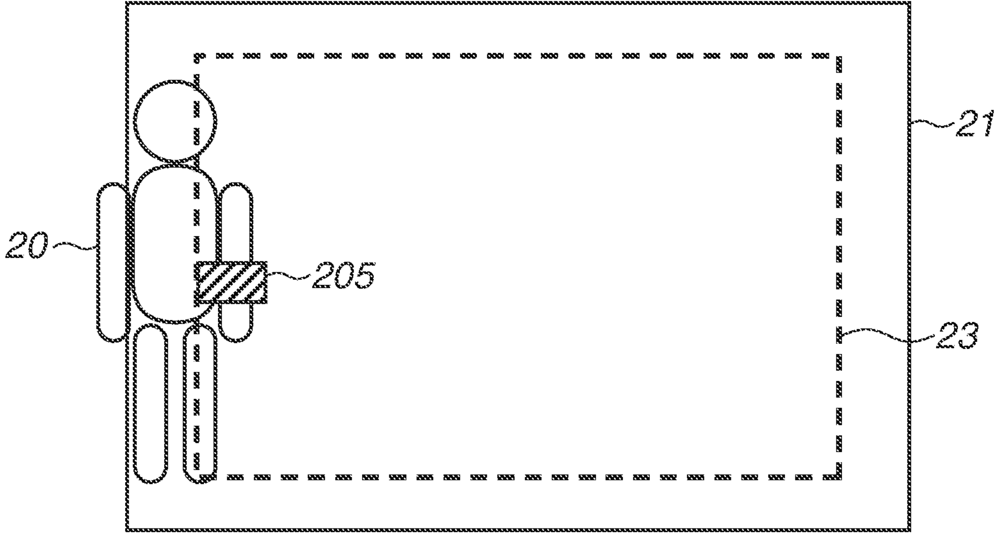

In step S404, the image processing unit 107 determines whether the position of the subject 20 detected by the position detection unit 112 (the second detection unit) in step S401 is within an imaging angle of view. With reference to FIGS. 5A and 5B, a description will be given of whether the position of the subject 20 is within the angle of view.

FIGS. 5A and 5B each illustrate an example of a case where the measurement apparatus 205 is attached to the arm of the subject 20 (a person). As illustrated in FIGS. 5A and 5B, the image processing unit 107 sets a first determination range 23 that is smaller than the entire image.

In FIG. 5A, the measurement apparatus 205 is within the image, but the subject 20 is not entirely within the image. In other words, this is a situation where the detection of the subject 20 by the subject detection unit 201 is difficult. Thus, the image processing unit 107 sets the first determination range 23 and determines whether the measurement apparatus 205 is within the first determination range 23. As illustrated in FIG. 5B, in a case where the measurement apparatus 205 is within the first determination range 23, it is expected that most of the subject 20 is included in the image, and the detection of the subject 20 by the subject detection unit 201 is likely to be successful. The first determination range 23 may be set by a user's operation via the instruction input unit 110 or may be automatically set by the image processing unit 107 using information such as the type, size, and moving speed of the subject 20. Alternatively, the first determination range 23 may be set based on a setting of the angle of view and a focal length of the optical system 104.

If the position of the subject 20 is outside the first determination range 23 (NO in step S404), the priority determination unit 113 determines that the detection of the subject 20 by the subject detection unit 201 is difficult, and the processing proceeds to step S409.

If the priority determination unit 113 determines that the position of the subject 20 detected by the position detection unit 112 in step S401 is within the first determination range 23 (YES in step S404), the processing proceeds to step S405.

In step S405, the image processing unit 107 determines whether the subject 20 has a detectable size in the image based on a calculated distance from the digital camera 100 to the subject 20.

Figure 6:
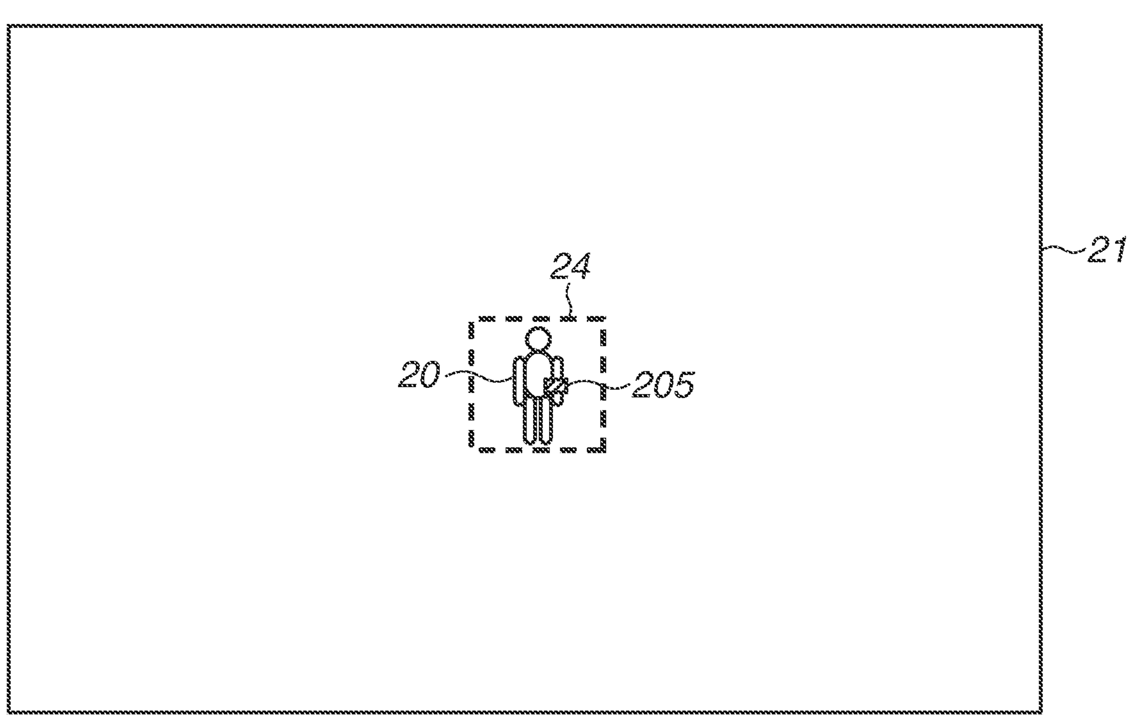
FIG. 6 is a diagram illustrating an example of a case where the subject appears small on the screen according to the first embodiment.

FIG. 6 illustrates an example of a case where the size of the subject 20 is small in the image. The subject 20 of a small size in the image means that the number of pixels corresponding to a region of the subject 20 on the image sensor of the imaging unit 105 is small. In other words, the accuracy of detection of the subject 20 decreases. The size of the subject 20 in the image is calculated based on the distance from the digital camera 100 to the subject 20, which is calculated from the position of the subject 20 detected by the position detection unit 112 in step S401, the focal length of the optical system 104, and the type and size of the subject 20 that are set by a user's operation or are obtained by automatic determination. Thus, as illustrated in FIG. 6, the image processing unit 107 sets a second determination range 24 within the image. The second determination range 24 is set to have a size that enables successful detection of the subject 20 by the subject detection unit 201.

The image processing unit 107 compares the size of the subject 20 with the second determination range 24.

If the size of the subject 20 in the image is smaller than the second determination range 24 (NO in step S405), the priority determination unit 113 determines that the detection of the subject 20 by the subject detection unit 201 is difficult, and the processing proceeds to step S409.

If the size of the subject 20 in the image is larger than or equal to the second determination range 24 (YES in step S405), the processing proceeds to step S406.

In a case where the priority determination unit 113 does not determine in steps S402 to S405 that the detection of the subject 20 by the subject detection unit 201 is difficult, then in step S406, the subject detection unit 201 performs subject position detection processing using the above-described procedure.

In step S407, the priority determination unit 113 determines whether the subject 20 is detectable in the subject position detection processing by the subject detection unit 201 in step S406.

Figure 7A:
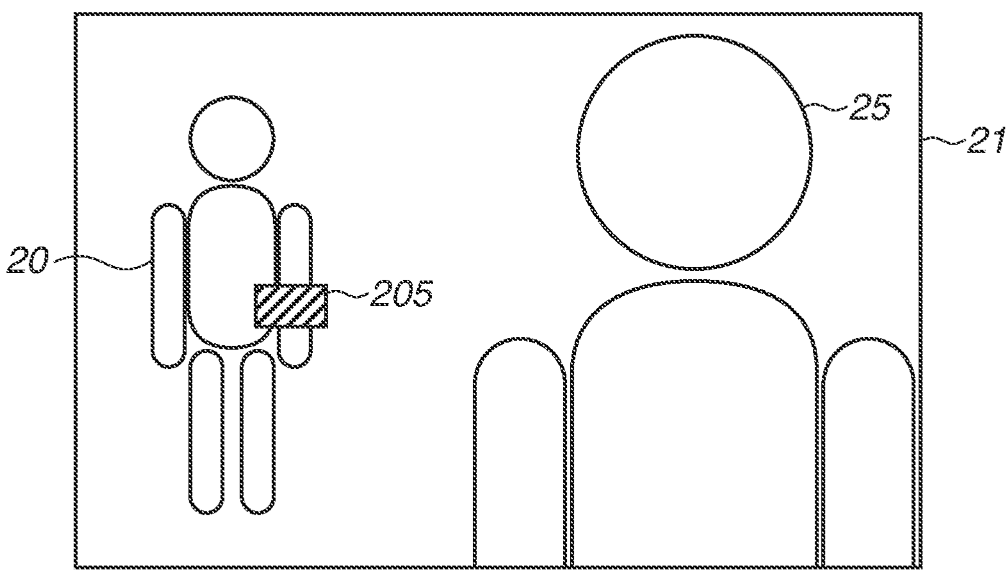
FIGS. 7A and 7B are diagrams illustrating an example of a case where the subject is hidden behind an obstacle according to the first embodiment.
Figure 7B:
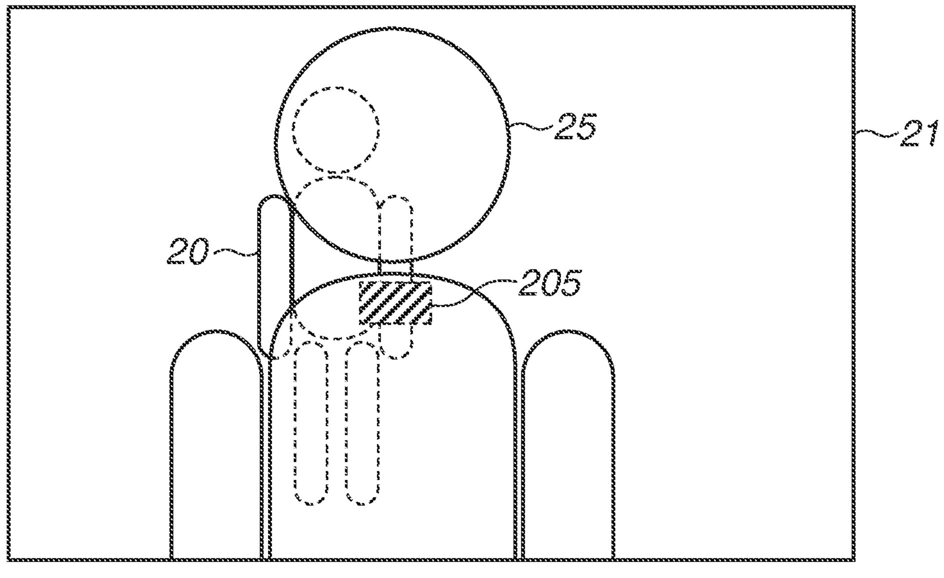

FIG. 7A illustrates a case where the subject 20 is not hidden behind an obstacle 25 (a person other than the subject 20 in this example) and is detectable in the image. FIG. 7B illustrates a case where the subject 20 is hidden behind the obstacle 25 and is not detectable in the image. Since the subject 20 is not recognizable in the image in the case of FIG. 7B (NO in step S407), the priority determination unit 113 determines that the detection of the subject 20 by the subject detection unit 201 is difficult, and the processing proceeds to step S409.

If the subject 20 is detectable in the subject position detection processing by the subject detection unit 201 in step S406 (YES in step S407), the processing proceeds to step S408.

In a case where the priority determination unit 113 does not determine in steps S402 to S405 and S407 that the detection of the subject 20 by the subject detection unit 201 is difficult, then in step S408, the priority determination unit 113 prioritizes the detection result by the subject detection unit 201 to determine the position of the subject 20.

In a case where the priority determination unit 113 determines in steps S402 to S405 and S407 that the detection of the subject 20 by the subject detection unit 201 is difficult, then in step S409, the priority determination unit 113 prioritizes the detection result by the position detection unit 112 to determine the position of the subject 20.

As described above, in the present embodiment, in the case where the detection of the subject 20 (the acquisition of the subject position information) by the subject detection unit 201 is difficult, the detection result of the position of the subject 20 by the position detection unit 112 is prioritized, whereby the subject 20 can be kept captured. Further, even if an error occurs due to a communication state or unnecessary shake of the measurement apparatus 205 is detected, the subject 20 can be kept captured.

Figure 8:
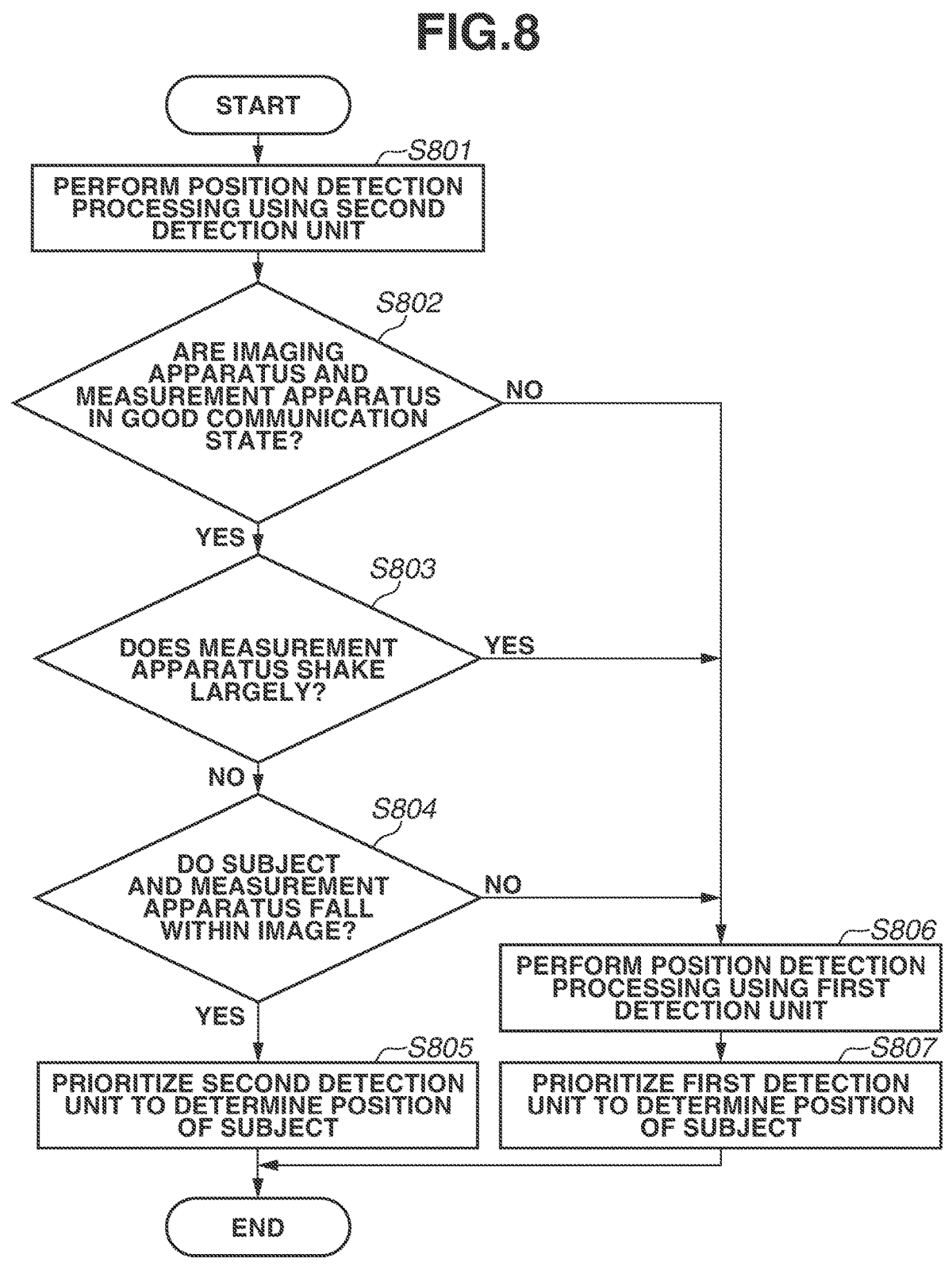

A subject detection method according to a second embodiment of the present disclosure will be described below with reference to FIGS. 8 to 10. FIG. 8 is a flowchart illustrating processing from when the digital camera 100 starts detection to when the digital camera 100 detects the subject 20. Steps in the flowchart are performed by the control unit 101 or by the components of the digital camera 100 based on instructions from the control unit 101.

In step S801, similarly to step S401, the position detection unit 112 performs position detection processing to detect the position of the subject 20. Upon completion of the processing, the processing proceeds to step S802.

In step S802, the information acquisition unit 203 makes a determination about the communication state between the digital camera 100 and the measurement apparatus 205. As described above, the information acquisition unit 203 acquires the information transmitted by the measurement apparatus 205 attached to the subject 20, and the position detection unit 112 calculates the position of the subject 20 with respect to the digital camera 100 based on the acquired information. When the transmission unit 207 of the measurement apparatus 205 transmits the information and a communication failure occurs between the transmission unit 207 of the measurement apparatus 205 and the reception unit 208 of the information acquisition unit 203, a time delay occurs in acquisition of the information about the position of the subject 20, which causes an error in the position. As a result, the reliability of the information about the position of the subject 20 detected by the position detection unit 112 decreases.

If the information acquisition unit 203 determines that the error in the position due to the communication failure is greater than a preset value (NO in step S802), the priority determination unit 113 determines that the detection of the position of the subject 20 by the position detection unit 112 is difficult, and the processing proceeds to step S806.

If the information acquisition unit 203 determines that the error in the position due to the communication failure is the preset value or less (YES in step S802), the processing proceeds to step S803.

In step S803, the position detection unit 112 determines whether the measurement apparatus 205 shakes largely in the position detection processing in step S801.

Figure 9:
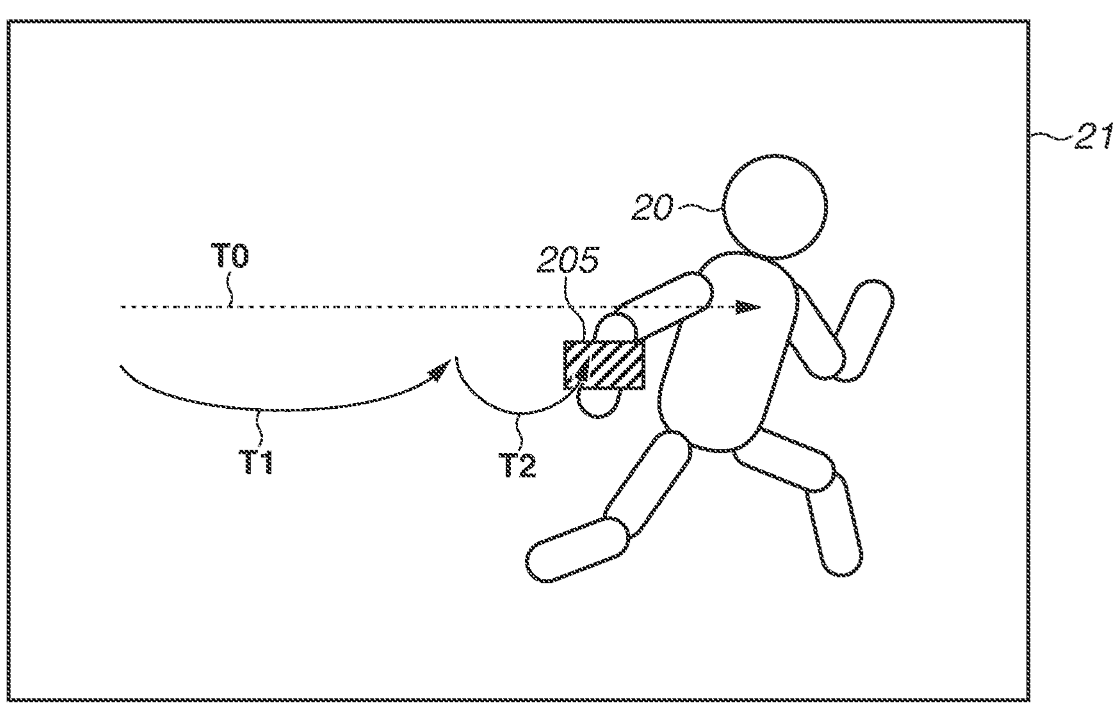
FIG. 9 is a diagram illustrating an example of a case where a movement trajectory of the measurement unit fluctuates according to the second embodiment.

For example, as illustrated in FIG. 9, in a case where the measurement apparatus 205 is attached to the arm of the subject 20 and if the subject 20 runs, the measurement apparatus 205 detects the position following the swinging of the arm.

In FIG. 9, TO represents a movement trajectory of the center of gravity of the subject 20 who is running, T1 represents a movement trajectory of the measurement apparatus 205 with the arm swinging forward, and T2 represents a movement trajectory of the measurement apparatus 205 with the arm swinging backward. In a case where the position detection unit 112 detects the subject 20 based on a signal from the measurement apparatus 205, the position detection unit 112 detects the movement trajectories T1 and T2 although the user wishes to obtain the movement trajectory TO. Especially, in an automatic tracking system such as the panhead 114 that is driven in the pan and tilt directions based on the position information about the subject 20, a captured image fluctuates in a vertical direction. Thus, if the amount of change in the position of the subject 20 or the moving speed of the subject 20, which is detected by the position detection unit 112, does not satisfy a preset condition (YES in step S803), the priority determination unit 113 determines that the detection of the position of the subject 20 by the position detection unit 112 is difficult, and the processing proceeds to step S806.

If the amount of change in the position of the subject 20 or the moving speed of the subject 20, which is detected by the position detection unit 112 (the second detection unit), satisfies the preset condition (NO in step S803), the processing proceeds to step S804.

In step S804, the position detection unit 112 determines whether the measurement apparatus 205 and the subject 20 fall within the image based on the distance from the digital camera 100 to the subject 20 that is calculated from the position of the subject 20 detected in step S801.

Figure 10:
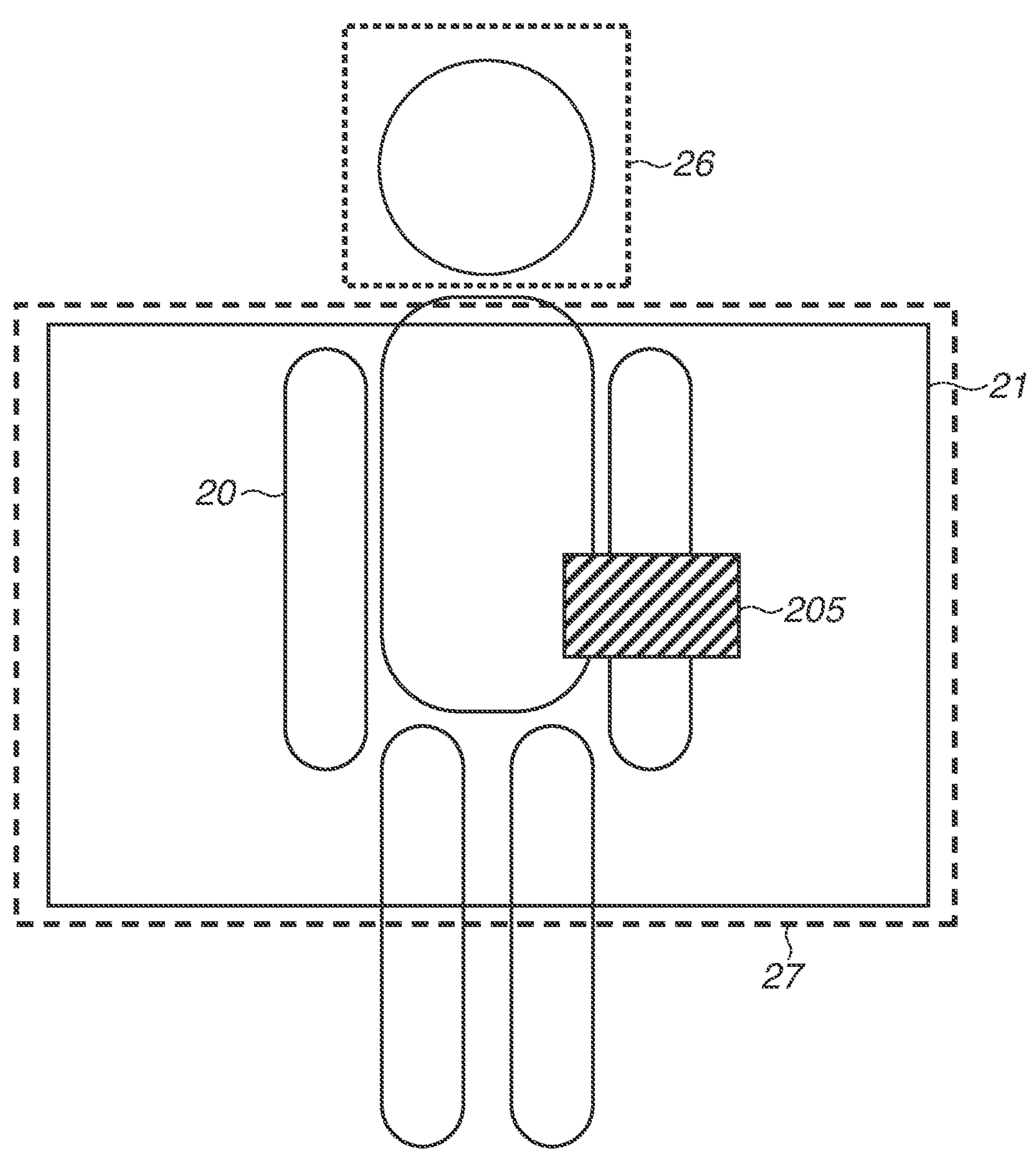
FIG. 10 is a diagram illustrating an example of a case where both the measurement unit and the subject do not fall within the screen according to the second embodiment.

As illustrated in FIG. 10, there may be a case where the subject 20 does not fall within the image when the digital camera 100 and the subject 20 are close enough or the focal length of the optical system 104 is long. In such a case, there is a possibility that both of the measurement apparatus 205 and a part of the subject 20 (e.g., a face 26 in a case where the subject 20 is a person) that is desired by the user are unable to fall within the image. To address this, the image processing unit 107 presets a third determination range 27 that enables both of the measurement apparatus 205 and the part of the subject 20 desired by the user to fall within the image. At this time, setting the third determination range 27 to be larger than the screen 21 can prevent erroneous detection.

If the size of the subject 20 on the screen 21 is larger than the third determination range 27 (NO in step S804), the priority determination unit 113 determines that the detection of the position of the subject 20 by the position detection unit 112 is difficult, and the processing proceeds to step S806. At this time, the size of the subject 20 in the image is calculated based on the distance from the digital camera 100 to the subject 20, which is calculated from the position of the subject 20 detected by the position detection unit 112 in step S801, the focal length of the optical system 104, and the type and size of the subject 20 that are set by a user's operation or are obtained by automatic determination.

If the size of the subject 20 in the image is smaller than or equal to the third determination range 27 (YES in step S804), the processing proceeds to step S805.

In a case where the priority determination unit 113 does not determine in steps S802 to S804 that the detection of the position of the subject 20 by the position detection unit 112 is difficult, then in step S805, the priority determination unit 113 prioritizes the detection result by the position detection unit 112 to determine the position of the subject 20.

In a case where the priority determination unit 113 determines in steps S802 to S804 that the detection of the position of the subject 20 by the position detection unit 112 is difficult, then in step S806, the subject detection unit 201 performs the subject position detection processing using the above-described procedure. The processing then proceeds to step S807.

In step S807, the priority determination unit 113 prioritizes the detection result by the subject detection unit 201 to determine the position of the subject 20.

As described above, in the present embodiment, in a case where the detection of the position of the subject 20 by the position detection unit 112 is difficult, the detection of the position of the subject 20 by the first detection unit is prioritized, whereby the subject 20 can be kept captured even under a condition that makes it difficult to recognize the subject 20 on the screen 21.

While the embodiments of the present disclosure have been described above, the present disclosure is not limited to these embodiments and the embodiments can be modified and changed in various manners without departing from the scope of the present disclosure.

According to the above-described embodiments, it is possible to provide an imaging apparatus that is capable of keeping capturing a subject even under a condition that makes it difficult to recognize the subject on a screen and is capable of keeping capturing the subject regardless of where in the subject a position information transmission apparatus is attached.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-190752, filed Nov. 29, 2022, which is hereby incorporated by reference herein in its entirety.

What is claimed is:

1. An imaging apparatus comprising:

an image sensor configured to output an image;

an information acquisition unit configured to acquire information from a measurement unit attached to a subject; and at least one processor configured to function as:

a first detection unit configured to detect the subject in the image;

a second detection unit configured to detect a position of the subject based on the information acquired by the information acquisition unit;

a brightness determination unit configured to determine brightness of the image; and a determination unit configured to:

obtain, from the brightness determination unit, brightness of a first region of the image and brightness of a second region of the image different from the first region;

compare a difference between the brightness of the first region and the brightness of the second region with a preset second threshold value; and determine the position of the subject by selecting a detection result such that, when the difference exceeds the second threshold value, the position is determined on the basis of a detection result of the second detection unit, and when the difference does not exceed the second threshold value, the position is determined on the basis of a detection result of the first detection unit.

2. The imaging apparatus according to claim 1, further comprising a shake detection unit configured to detect a shake of the imaging apparatus, wherein the determination unit further determines the position of the subject based on the detection result of the second detection unit in a case where an amount of the shake is greater than a first value.

3. The imaging apparatus according to claim 1, wherein the determination unit is further configured to, in a case where brightness of at least part of the image is lower than a first value, determine the position of the subject on the basis of the detection result obtained by the second detection unit irrespective of comparison of the brightness of the first region and the brightness of the second region.

4. The imaging apparatus according to claim 1, further comprising a contrast determination unit configured to determine contrast, wherein, in a case where a value of contrast of at least part of the image is less than a first value, the determination unit further determines the position of the subject on the basis of the detection result obtained by the second detection unit.

5. The imaging apparatus according to claim 1, further comprising a setting unit configured to set a first determination range in the image, wherein, in a case where the position of the subject detected by the second detection unit is outside the first determination range, the determination unit further determines the position of the subject on the basis of the detection result obtained by the second detection unit.

6. An imaging apparatus comprising:

an image sensor configured to output an image;

an information acquisition unit configured to acquire information from a measurement unit attached to a subject; and at least one processor configured to function as:

a first detection unit configured to detect the subject in the image;

a second detection unit configured to detect a position of the subject based on the information acquired by the information acquisition unit;

a setting unit configured to set, in the image, a second determination range for evaluating a size of the subject; and a determination unit configured to:

compare a size of the subject in the image with the second determination range; and determine the position of the subject on the basis of a detection result obtained by the second detection unit in a case where the size of the subject in the image is smaller than the second determination range.

7. The imaging apparatus according to claim 1, wherein, in a case where the subject is not detectable by the first detection unit, the determination unit further determines the position of the subject on the basis of the detection result obtained by the second detection unit.

8. A method for controlling an imaging apparatus, the method comprising:
- acquiring an image;
- performing first detection to detect a subject in the image;
- acquiring information from a measurement unit attached to the subject;
- performing second detection to detect a position of the subject based on the acquired information;
- determining brightness of the image;
- obtaining, in the determining, brightness of a first region of the image and brightness of a second region of the image different from the first region;
- comparing a difference between the brightness of the first region and the brightness of the second region with a preset second threshold value; and
- determining the position of the subject by selectively prioritizing one of detection results, such that:
  - in a case where the difference exceeds the second threshold value, the position of the subject is determined on the basis of a second detection result; and
  - in a case where the difference does not exceed the second threshold value, the position of the subject is determined on the basis of a first detection result.

9. A non-transitory computer-readable storage medium storing a program for causing a computer to execute the method according to claim 8.

10. A method for controlling an imaging apparatus, the method comprising:
- acquiring an image;
- performing first detection to detect a subject in the image;
- acquiring information from a measurement unit attached to the subject;
- performing second detection to detect a position of the subject based on the acquired information;
- setting, in the image, a second determination range for evaluating a size of the subject;
- comparing a size of the subject in the image with the second determination range; and
- determining the position of the subject on the basis of a detection result obtained by the second detection unit in a case where the size of the subject in the image is smaller than the second determination range.

11. A non-transitory computer-readable storage medium storing a program for causing a computer to execute the method according to claim 10.

12. The imaging apparatus according to claim 6, wherein the setting unit is further configured to set a first determination range in the image, and
- wherein, in a case where the position of the subject detected by the second detection unit is outside the first determination range, the position of the subject is determined based on the detection result of the second detection unit.

13. The imaging apparatus according to claim 6, wherein the setting unit sets the second determination range as a rectangular region centered on the position of the subject detected by the second detection unit.

14. The imaging apparatus according to claim 6, wherein the setting unit sets a size of the second determination range based on at least one of a distance to the subject acquired by the information acquisition unit, a focal length of an optical system, and an actual size of the subject.

15. The imaging apparatus according to claim 6, wherein, in a case where it is determined that the size of the subject is smaller than the second determination range, the determination unit outputs a control signal to increase a zoom magnification of an optical system so as to enlarge an imaging size of the subject.

* * * * *